United States Patent [19]
Ahluwalia

[11] 3,973,673
[45] Aug. 10, 1976

[54] METHOD AND APPARATUS FOR TURNING OVER SHEETS

[75] Inventor: Surendra S. Ahluwalia, Collingwood, Canada

[73] Assignee: Libbey-Owens-Ford Company, Toledo, Ohio

[22] Filed: Feb. 6, 1975

[21] Appl. No.: 547,825

[52] U.S. Cl. ................................ 198/285; 198/35
[51] Int. Cl.[2] ........................................ B65G 47/24
[58] Field of Search ............... 198/34, 35, 235, 284, 198/285; 214/1 Q, 1 QC, 1 QD

[56] References Cited
UNITED STATES PATENTS

| | | | |
|---|---|---|---|
| 1,763,308 | 6/1930 | Horn | 198/35 X |
| 2,667,259 | 1/1954 | Parker | 198/235 |
| 3,024,890 | 3/1962 | Belk | 198/34 |
| 3,034,632 | 5/1962 | Wampler | 198/284 |
| 3,047,288 | 7/1962 | Ramm | 198/235 X |
| 3,067,853 | 12/1962 | Carson et al | 198/35 |
| 3,070,211 | 12/1962 | Williamson | 198/35 |
| 3,074,530 | 1/1963 | Rosenleaf | 198/284 |
| 3,251,452 | 5/1966 | Conway et al. | 198/34 |
| 3,367,478 | 2/1968 | Brookhyser | 198/35 |
| 3,506,109 | 4/1970 | Braas | 198/35 |

*Primary Examiner*—John J. Love
*Assistant Examiner*—Richard K. Thomson
*Attorney, Agent, or Firm*—Collins, Oberlin & Darr

[57] ABSTRACT

A method of and apparatus for inverting and stacking matched pairs of moving glass sheets, one on the other, having a device for longitudinally spacing the sheets of each pair relative to each other prior to their entering the inverting and stacking mechanism. A lift device, together with the inverting and stacking mechanism, holds the first sheet of the matched pair stationary above a conveyor while the second sheet is advanced therebeneath to a predetermined position at which point the first sheet is deposited on the second sheet in a closely matched relationship. Hold-down devices maintain the orientation of the first sheet relative to the second sheet.

14 Claims, 5 Drawing Figures

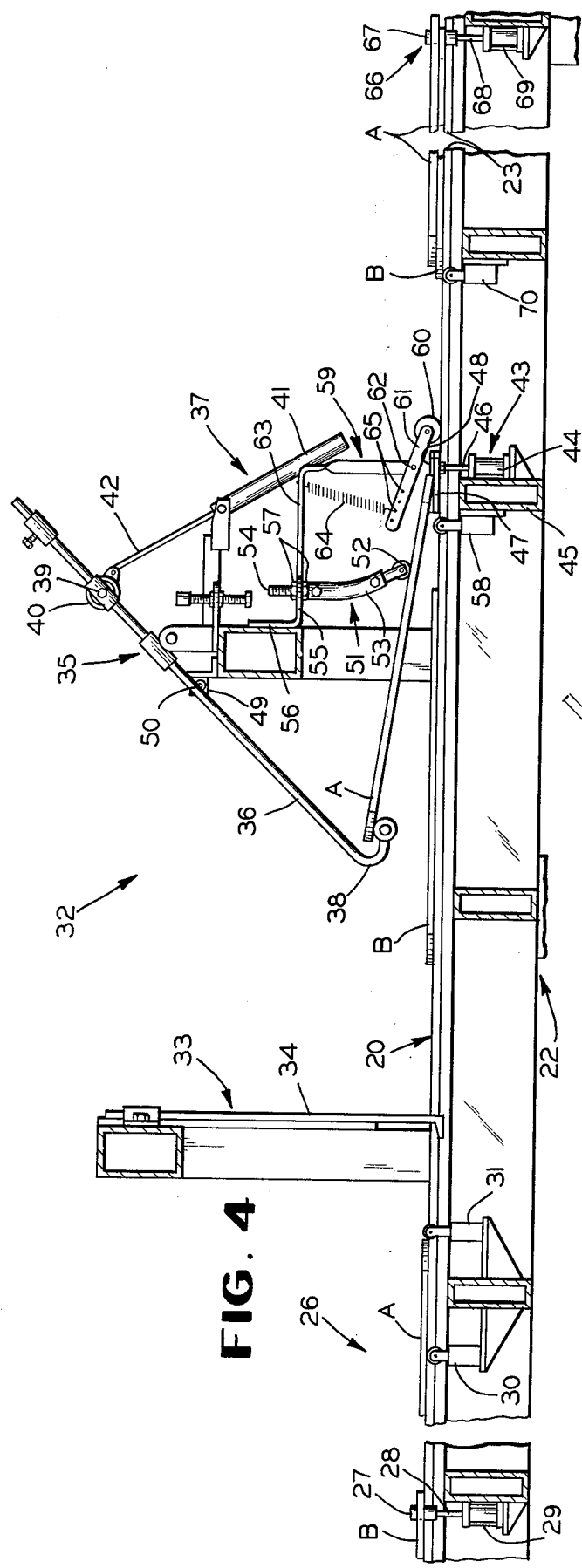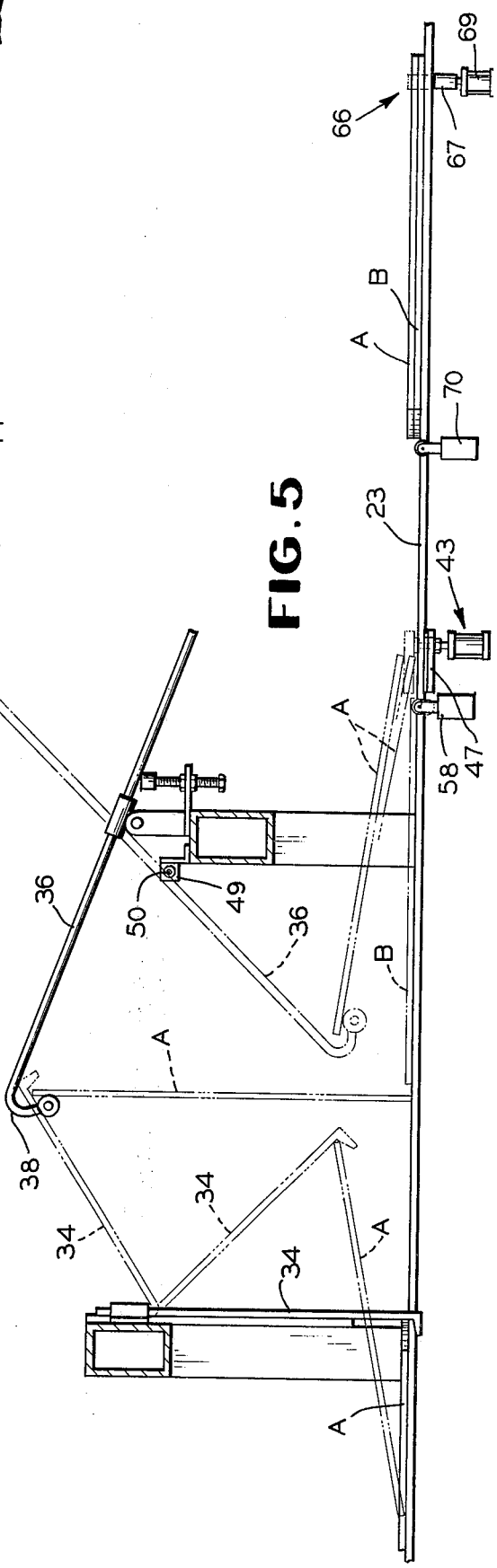

METHOD AND APPARATUS FOR TURNING OVER SHEETS

BACKGROUND OF THE INVENTION

1. Field of the Invention

This invention relates generally to improvements in a method of and apparatus for turning over sheet articles, and more particularly to apparatus for inverting a glass sheet and placing it on top of another paired sheet.

In the production of bent laminated glass products, such as present-day automobile windshields, it is common practice to achieve the desired configuration by bending flat sheets of glass in pairs to the contour of a mold. Prior to the bending thereof, the sheets are thoroughly cleaned and dried and a surface of at least one and preferably both of the sheets has applied thereto, a coating of a water soluble parting material to prevent the sheets from fusing to one another when heated during the bending process. The sheets are then placed one upon the other with the parting material therebetween and their edges aligned in the preparation for bending.

2. Description of the Prior Art

As disclosed in U.S. Pat No. 3,034,632, issued on May 15, 1962, pairs of glass sheets are carried horizontally or in a flat position on a conveyor through the various steps of the above-mentioned process, which includes inverting the first sheet of each pair and laying it upon the second sheet. In this apparatus, when the first sheet is lifted to a vertical position in the turnover process, it is transferred to and supported by a lowering device until there is a relatively small vertical space between it and the second sheet at which time it is permitted to fall freely upon the second sheet.

In FIG. 6 of the above-mentioned patent, it will be noted that as the first sheet is lifted, it pivots first on its trailing edge on the conveyor and then, as it is lowered toward the second sheet, the pivot is transferred to the front upper edge of the second sheet and the lower surface of the first sheet. This pivoting of the first sheet on the conveyor and then on the second sheet sometimes causes the two sheets to be chipped along their respective edge portions. Also, it will be noted that after the first sheet has been inverted and placed upon the second sheet, their front lateral edges are not aligned as is necessary for further handling of the sheets, necessitating that the sheets be slid relative to each other into a superimposed relationship. This chipping and sliding of the sheets may form internal scratches therebetween which are optically objectionable, resulting in the sheets being rejected and discarded.

SUMMARY OF THE INVENTION

Generally speaking, this invention contemplates raising the first sheet of a pair of sheets totally off the conveyor during its inverting cycle and thus arresting movement of the first sheet, advancing the second sheet therebeneath and then lowering the first sheet thereon to substantially eliminate the pivoting of the first sheet on the upper corner of the leading edge of the second sheet and minimizing the amount of sliding of the second sheet relative to the first sheet.

To this end, a pair of vertically movable cushion surface platforms are provided on the conveyor downstream of the turnover mechanism to lift the trailing edge of the first sheet off of the conveyor while the leading edge is still supported by the turnover mechanism. The platforms may be raised and lowered by air motors controlled by a pair of limit switches, one being actuated by the turnover mechanism to raise the platforms above the level of the conveyor and the other being actuated by the second sheet to lower the platforms below the level of the conveyor.

A first pair of hold-down rolls may be provided above the platforms to hold the first sheet in contact therewith. Also, a second pair of tension hold-down rolls is provided downstream of the platforms to prevent the disorientation of the first sheet relative to the second sheet which may occur when the first sheet is dropped on the second sheet and the layer of air therebetween is displaced.

OBJECTS AND ADVANTAGES

An object of this invention is to provide a method of and apparatus for stacking a pair of sheets, one upon the other, in superimposed pairs in such a manner that breakage of the sheets and chipping of the edges thereof is effectively overcome.

Another object of this invention is to substantially eliminate the pivoting of the first sheet on the upper corner of the leading edge of the second sheet for preventing chipping thereof.

Another object of this invention is to closely align the mating edges of the sheets during the inverting procedure so that a minimum amount of sliding between the sheets occurs in finally bringing the sheets into vertical alignment.

Other objects and advantages of the invention will become more apparent during the course of the following description when read in connection with the accompanying drawings.

BRIEF DESCRIPTION OF THE DRAWINGS

In the drawings, wherein like numerals are employed to designate like parts throughout the same:

FIG. 2 is a plan view of the apparatus shown in FIG. 1;

FIG. 3 is a transverse sectional view taken substantially along line 3—3 of FIG. 2;

FIG. 4 is an enlarged side elevational view of the sheet turnover apparatus shown in FIG. 1; and FIG. 5 is a diagrammatic side elevational view of the turnover apparatus with the various positions taken by the apparatus in operation being shown in broken lines.

DESCRIPTION OF THE PREFERRED EMBODIMENT

Figure 1:
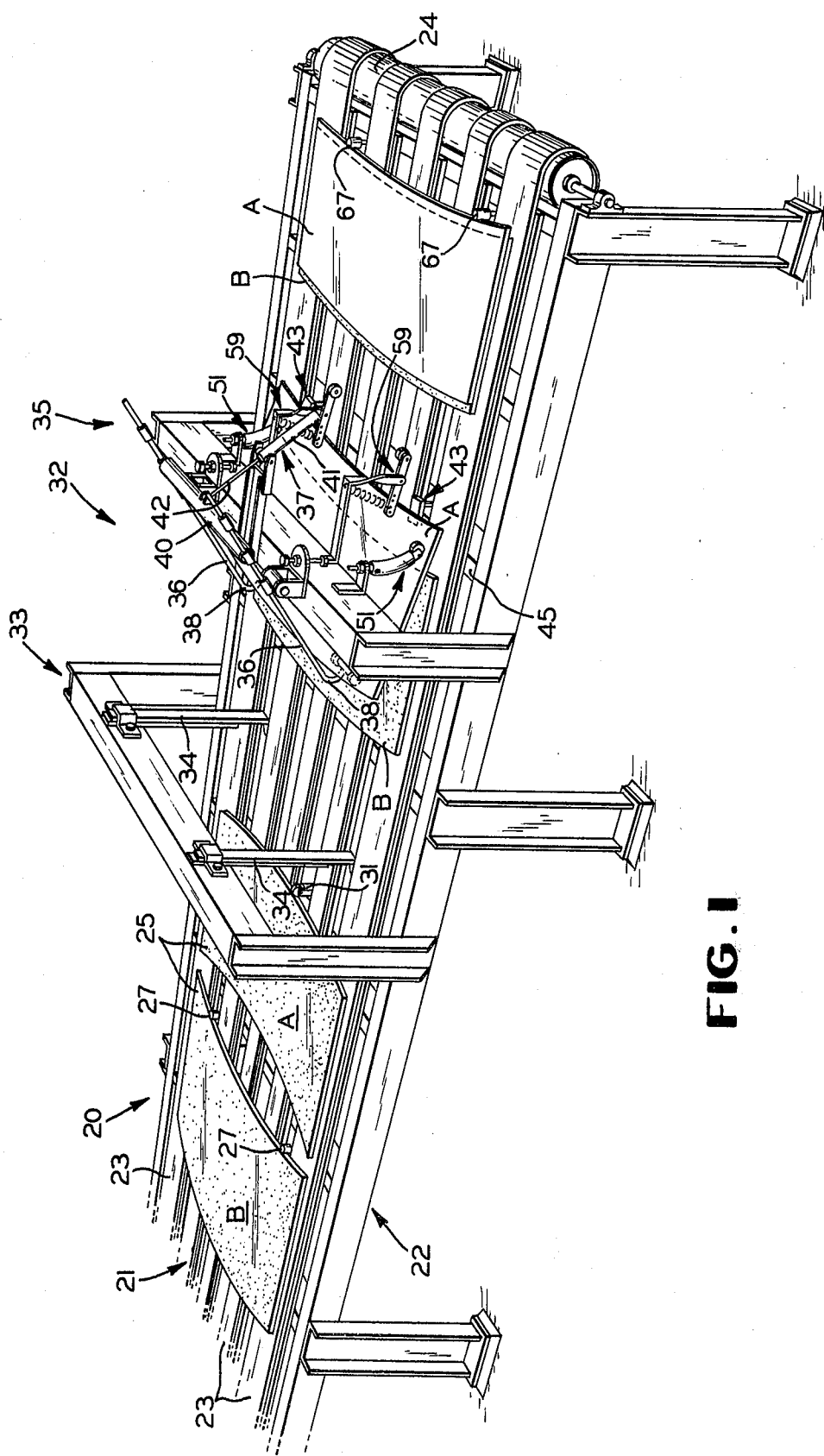
FIG. 1 is a perspective view of a sheet turnover apparatus embodying the invention.
Figures 2, 3:
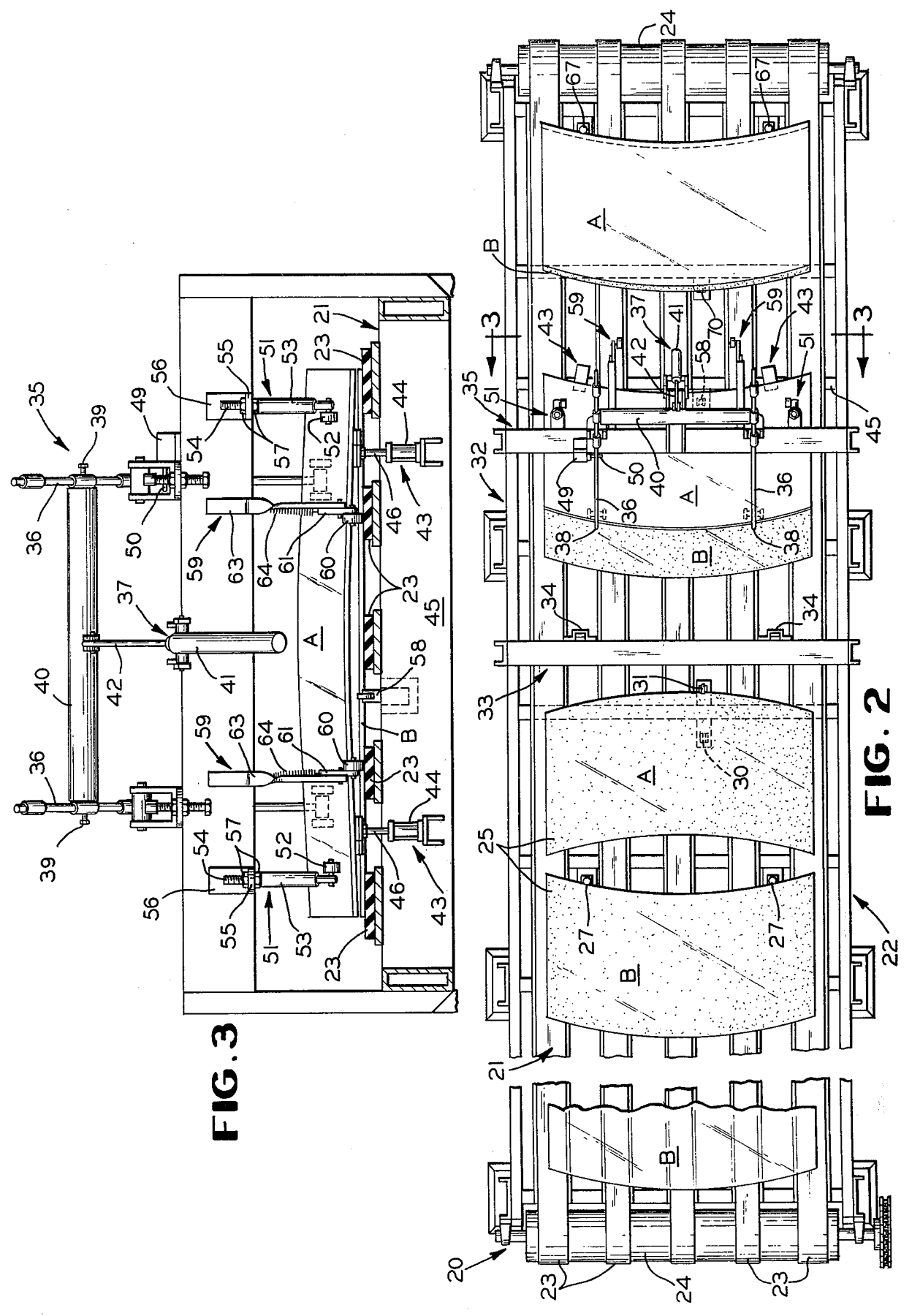

Referring to FIGS. 1 and 2 of the drawings, a conveyor generally indicated by the numeral 20 is comprised of a horizontally disposed surface 21 supported on a frame 22 over which multiple endless belts 23 of rubber or other suitable material are moved by means of rolls 24 located at each end thereof. Identical sheets are placed on the belts 23 at a loading station (not shown) by an operator and are spaced in pairs as at 25 substantially as shown in FIGS. 1 and 2, with the lead sheet of a pair being designated by the letter A and the second sheet by the letter B. A suitable aligning device (not shown) bears against the leading edge of each sheet A and B as it is loaded on the conveyor 20 to laterally align the sheets A and B of each pair on the conveyor.

The paired sheets A and B are progressively moved through a spacing device 26 to provide a minimum gap of about 9 to 10 inches, the purpose of which will be described hereinafter, between the paired sheets A and B. As shown in FIGS. 2 and 4, this spacing device 26 may comprise a pair of vertically movable stop pins 27 such as piston rods 28 of air motors 29 mounted on a cross member of the conveyor frame 22. The air motors may be controlled by a pair of longitudinally spaced limit switches 30 and 31 also mounted on cross members of the frame 22. The lead sheet A of a pair of sheets first trips limit switch 30 to raise the stop pins 27 above the level of the upper flights of belts 23 to engage the leading edge and hold the sheet B while the sheet A continues to advance with the conveyor belts 23. Subsequently, the lead sheet A trips the limit switch 31 to lower the stop pins 27 beneath the level of the conveyor belts 23, thus permitting the second sheet B to advance in a spaced relationship along the conveyor 20 with the sheet A.

Subsequently, along the conveyor 20, there is provided a turnover apparatus such as shown in the aforementioned U.S. Pat. No. 3,034,632 and indicated generally at 32, to turn the sheet A of each pair of sheets over upon its paired sheet B. Such a turnover apparatus 32 is comprised of two basic sections, a lifting section 33 which raises and inverts the lead sheet A by means of a pair of flexible fingers 34, and a lowering section 35 which supports the sheet A in its descent by means of a pair of lowering arms 36. Since the structure and operation of the lifting and lowering sections 33 and 35, respectively, are substantially the same as for those disclosed and described in the aforementioned U.S. patent, further description thereof is not deemed necessary.

In addition, the lowering section 35 may be provided with a conventional dampening device 37 to prevent the arms 36 from oscillating and insure that elbow portions 38 will be in position to receive the leading edge of the sheet A as it moves upwardly toward a vertical position. Thus, the upper portions of the arms 36 are interconnected by a horizontal pintle 39 which rotatably mounts a cylindrical sleeve 40. The body of the dampening device 37 is pivotally mounted on the frame of the lowering section 35 and its piston rod 42 is pivotally connected to the sleeve 40 as clearly shown in FIGS. 1 and 4.

The novel feature of this invention resides in means to arrest the inverting cycle of sheet A and position sheet B therebeneath for substantially eliminating pivoting of sheet A on sheet B and sliding of sheet B relative to sheet A. To this end, and referring now to FIGS. 1 and 2, a pair of lifting devices 43 is disposed along the conveyor 20 downstream of and adjacent the lowering section 35 and in a position to raise the sheet A off the conveyor belts 23. As best shown in FIG. 4, the lifting devices comprise a pair of like, transversely spaced air cylinders 44 vertically mounted on a cross member 45 of the conveyor frame 22. The piston rod 46 of each of the air cylinders 44 is provided with a horizontal platform 47, the upper surface of which may be provided with a pad 48 of soft material to protect the lower surface of the sheet A when it is lifted thereby. In operation, the platforms 47 are raised from their normal positions below the surface of the upper flights of the conveyor belts 23 by means of the air cylinders 44 which are actuated by a limit switch 49. The limit switch 49 is mounted on the frame of the lowering section 35 in a position so that its actuating arm 50 (see FIG. 2) is operated by downward movement of one of the arms 36. Thus, when sheet A is lifted off the conveyor, the motion of the inverting cycle is arrested and sheet A is held stationary.

A pair of adjustable, resiliently mounted hold-down devices 51 is provided to bear against the upper surface of the sheet A to hold the sheet A in the elbow portions 38 of the lowering arms 36 on the platforms 47 of the lifting devices 43. As shown in FIGS. 3 and 4, each hold-down device 51 may comprise a sheet contacting roller 52 mounted on one end of a depending resilient tubular cylinder 53 which may be formed of a rubber material. The upper end of this tubular cylinder 53 is provided with a threaded stud 54 which projects through the horizontal leg 55 of an angle bracket 56 attached to the frame of the lowering section 35. Lock nuts 57 are provided on the stud 54, one on each side of the leg 55, for the vertical adjustment of the roller 52.

As shown in FIG. 4, during this time sheet B of the matched pairs of sheets is advanced along the conveyor 20 until it is substantially positioned beneath sheet A. As hereinbefore mentioned, a minimum gap of about 9 to 10 inches is provided between advancing sheets of the matched pairs. This gap provides the time required for arresting the inverting and lowering movement of sheet A so that the front edge of sheet B may be moved to within ¾ to 1 inch of the front edge of sheet A when sheet A is deposited on sheet B. As shown in FIGS. 4 and 5, a limit switch 58 is mounted on the conveyor 20 ahead of and in close proximity to the lifting devices 43. The limit switch 58 is actuated by the front edge of sheet B and controls the air cylinders 43 to lower the platforms 47 beneath the level of the belts 23. Thus, as sheet B is advanced, it actuates the limit switch 58 to resume the inverting cycle of sheet A and deposit it on sheet B. In this arrangement, it will be noted that (1) the pivoting of sheet A on the front upper corner of sheet B is reduced to a minimum and (2) the front edges of sheets A and B are closely spaced (between ¾ to 1 inch) thus reducing the amount of sliding therebetween to a minimum in producing final alignment whereby the possibility of cullet chips and internal scratches between the sheets is substantially eliminated.

Even though the vertical distance between sheets A and B is quite small when sheet A is permitted to freely fall on sheet B, a cushion of air exists therebetween which can change the orientation of sheet A with respect to sheet B. Thus, a second pair of hold-down devices 59 is provided downstream of the lifting devices 43 to bear against sheet A and prevent any change in its orientation. As best shown in FIGS. 3 and 4, each hold-down device 59 may comprise a sheet contacting roller 60 mounted on one end of an arm 61 which is pivotally mounted as at 62 intermediate its ends to a bracket 63 fixedly secured to the frame of the lowering section 35. A tension spring 64 is connected between the other end of the arm 61 and the bracket 63 to urge the roller 60 into contact with sheet A. The end of the tension spring 64 connected to the arm 61 is positionable in any one of a series of holes 65 provided along the arm 61 to vary the urging force of the roller 60 against sheet A.

Although the lateral edges of sheets A and B are closely spaced with respect to each other after they leave the inverting and stacking apparatus, it is desirable that they be exactly aligned for their further handling. Therefore, as shown in FIGS. 2 and 4, an alignment device 66 is provided along the conveyor 20 downstream of the inverting and stacking apparatus. This alignment device 66 may comprise a pair of laterally spaced vertically movable stop pins 67 such as piston rods 68 of double-acting air motors 69 mounted on the conveyor frame 22. The air motors 69 may be controlled by a limit switch 70 provided on the conveyor 20 ahead of the motor 69. As best shown in FIGS. 4 and 5, the piston rods 68 are in their normally extended position above the belts 23 to hold sheet A stationary while sheet B is advanced by the belts 23. When the trailing edge of sheet B has passed over the limit switch 70, it is actuated to lower the piston rods 68 beneath the level of the belts 23 thereby permitting the matched aligned pairs of sheets A and B to advance to their next operation.

Briefly reviewing the operation of the turnover apparatus, as the sheets arrive at a loading station for conveyor 20 from previous operations they are placed, either manually or mechanically, on conveyor 20 in matched pairs, leading sheet A being closely followed by trailing sheet B with a suitable interval being provided between trailing sheet B of one pair and leading sheet A of the succeeding pair. The sheets pass through a spacing device 26 where a minimum gap therebetween is provided for their further handling.

After the sheets have been properly spaced with respect to each other, they proceed to the area of the turnover apparatus where the leading edge of leading sheet A is engaged by fingers 34. As the sheet A continues to move forwardly, the leading edge thereof is swung upwardly in an arc while at the same time it pivots about its trailing edge which continues to travel horizontally on endless belts 23. Near the top of its upward swing, the leading edge of sheet A moves in behind the elbow portions 38 of the arms 36 which engage the surface of the sheet opposite to that engaged by the fingers 34, so that during a portion of the turnover operation, the sheet A is held by and between the fingers 34 and the elbows 38.

As sheet A passes the vertical position, the former leading edge thereof begins to swing downwardly in an arc while also pivoting about the former trailing edge, which continues to move horizontally on endless belts 23 and which now becomes the leading edge. When sheet A has been lowered in close proximity to the belts 23, lift devices 43 raise its leading edge off the belts 23 to arrest continued movement of sheet A. During this arrested movement interval of sheet A, sheet B is advanced by the belts 23 until it is carried to a predetermined position with respect to sheet A, at which time the lift devices 43 are lowered so that forward motion of sheet A is resumed and it is dropped onto sheet B.

I claim:

1. A method for turning a leading sheet over and depositing it upon a trailing sheet as the sheets are moved along a defined path, comprising the steps of raising the forward edge of said leading sheet from the defined path while permitting its rear edge to move along the defined path to invert said sheet, raising the rear edge of said leading sheet from the defined path to arrest the inverting cycle and hold said sheet motionless above the defined path, permitting said trailing sheet to move along the defined path into a predetermined location beneath said leading sheet, and lowering said rear edge of said leading sheet onto the defined path to resume the inverting cycle of said leading sheet when said trailing sheet reaches its predetermined location, whereby said leading sheet is inverted and deposited upon said trailing sheet in a predetermined position.

2. A method for turning a leading sheet over and depositing it upon a trailing sheet as claimed in claim 1, including the step of positioning the trailing sheet behind the leading sheet with a predetermined spacing as they are moved along the defined path before raising and inverting said leading sheet.

3. A method for turning a leading sheet over and depositing it upon a trailing sheet as claimed in claim 1, including the step of aligning said sheets after said leading sheet is deposited upon said trailing sheet.

4. A method for inverting a substantially rigid sheet advancing along a moving conveyor and depositing the inverted sheet at a subsequent predetermined location on the moving conveyor, comprising the steps of engaging the leading edge of said sheet while the trailing edge thereof continues to advance with said moving conveyor thereby swinging said leading edge upwardly and then downwardly whereby said sheet pivots about said trailing edge into an inverted position, raising said trailing edge from said moving conveyor to interrupt the inverting cycle of said sheet while said moving conveyor continues to advance beneath said sheet, lowering said trailing edge onto said moving conveyor to resume the inverting cycle of said sheet, and depositing said sheet in its inverted position at the predetermined location on said moving conveyor.

5. In a sheet turnover apparatus of the type having means for moving sheets along a defined path, sheet lifting means for engaging the leading edge of a sheet to lift it upwardly about its trailing edge as said trailing edge continues to move with the moving means together with means for receiving the lifted edge of the sheet from the lifting means and for lowering it upon the moving means in an inverted position, the improvement comprising means for lifting said trailing edge of the sheet off the moving means while said leading edge is contained by the receiving and lowering means for arresting its turnover cycle, and means for lowering said trailing edge of the sheet onto the moving means for resuming the turnover cycle of the sheet.

6. In a sheet turnover apparatus of the type having a conveyor for moving pairs of substantially rigid sheets along a defined path, sheet lifting means for engaging the front edge of the first sheet of a pair of sheets to lift it upwardly about its rear edge as the rear edge continues to move with the conveyor, means for receiving the front edge of the first sheet from the lifting means and lowering the front edge of the first sheet to invert the first sheet together with means for depositing the first sheet upon the second sheet, the improvement comprising means for lifting the rear edge of the first sheet off the conveyor while its front edge is contained by the receiving and lowering means for arresting its turnover cycle, and means for lowering the rear edge of the first sheet onto the conveyor when the second sheet of said pair of sheets is moved into a predetermined location beneath said first sheet whereby the first sheet is placed on a second sheet in an inverted and predetermined position.

7. An apparatus for turning the first sheet over upon the second sheet of a pair of sheets as claimed in claim 6, wherein the means for lifting the rear edge of the first sheet off said conveyor comprises a movable platform engageable with said rear edge of said first sheet, at least one power cylinder connected to said platform for raising said platform, and means operated by said sheet receiving and lowering means for actuating said power cylinder for raising said rear edge of said first sheet off said conveyor.

8. An apparatus for turning one sheet over upon another as claimed in claim 7, including means for holding said first sheet on said platform.

9. An apparatus for turning one sheet over upon another as claimed in claim 8, wherein said holding means comprises at least one resiliently mounted hold-down roll.

10. An apparatus for turning one sheet over upon another as claimed in claim 7, wherein said power cylinder is actuated by the second sheet to lower said platform and deposit the rear edge of the first sheet on said conveyor when said second sheet is in a predetermined location.

11. An apparatus for turning one sheet over upon another as claimed in claim 6, including means for urging said first sheet against said second sheet when said platform is in its lower position.

12. An apparatus for turning one sheet over upon another as claimed in claim 11, wherein said urging means comprises at least one pivotable hold-down roll including spring means for urging said roll into contact with said first sheet.

13. An apparatus for turning one sheet over upon another as claimed in claim 6, including means for spacing the sheets of the pair relative to each other on the conveyor when they are moved along the defined path.

14. In a sheet turnover apparatus of the type having means for moving a leading sheet and a trailing sheet along a defined path together with means disposed along the path in position to engage the front edge of the leading sheet to turn it over and deposit it upon the trailing sheet, the improvement comprising means for raising the rear edge of said leading sheet from said moving means to arrest the turnover cycle of and hold said sheet motionless above said defined path while said trailing sheet moves into a predetermined position beneath said leading sheet, and means for lowering said rear edge of said leading sheet onto said moving means for resuming its turnover cycle when said trailing sheet reaches its said predetermined position whereby said leading sheet is placed on said trailing sheet in an inverted and predetermined position.

* * * * *